United States Patent Office 3,362,827
Patented Jan. 9, 1968

3,362,827
POLYMERIC HARDENERS FOR GELATIN COMPOSITIONS
Yasushi Oishi and Yosuke Nakajima, both of Kanagawa-ken, Japan
No Drawing. Filed May 24, 1965, Ser. No. 458,422
Claims priority, application Japan, May 28, 1964, 39/29,771
15 Claims. (Cl. 96—111)

This invention relates to an aqueous gelatin composition and hardening of gelatin with the polymeric monochlorotriazine compounds to impart enhanced resistance to water.

In most photographic materials, gelatin is used as their constituting elements, for example in silver halide emulsion layers, protective coatings, substratum layers to film base, anti-halation layers, backing layers.

In photographic uses, such a gelatin layer is often treated with a succession of aqueous solutions which may vary in pH, in electrolyte concentration, and in temperature. The layers composed of untreated gelatin have poor resistance to water; in water the gelatin layers swell excessively and are scratched easily. Especially at high temperature, the untreated gelatin layers are dissolved in aqueous solutions.

A number of classes of compounds have been found useful for treating gelatin to improve the resistance to water. These compounds are called hardeners in photographic arts. These include, for example, inorganic compounds such as chromium salts, and organic compounds such as aldehyde, polyfunctional epoxide, polyfunctional ethyleneimine, and polyfunctional activated vinyl compounds. The use of these hardeners in photographic products has been well known.

Almost all hardeners of the classes known heretofore, however, have exhibited unwanted effects when used in photographic products. One serious drawback concerns the unwanted effects on photographic properties; for example, an increase in fog of the emulsion and a loss of photographic sensitivity. Other difficulties frequently encountered with such hardeners are insufficient water-solubility, causing the non-uniformity of gelatin layer; chemical instability of the hardeners in solid or dissolved state; or toxicity to human bodies in handling. Some hardeners lose their hardening effects when used in the presence of other kinds of photographic additives such as stabilizers and color-forming couplers. Some hardeners make the photographic layer yellow-stained when used with some kinds of color-forming couplers.

One object of our invention is to provide hardeners for gelatin which exhibit no detrimental photographic effects. Another object of our invention is to provide substances which when mixed make gelatin insoluble in aqueous solution of varying pH or temperature. A further object of our invention is to provide for hardening of gelatin by the use of polymeric monochlorotrazine compounds, which do not diffuse in gelatin.

We have found that gelatin is made resistant to water even at elevated temperature by incorporating therein water-soluble polymers with the following functional groups bonded thereto with covalent bond:

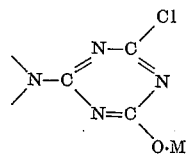

wherein M represents an alkali metal, e.g. sodium, potassium, or lithium.

The foregoing reactive polymers are prepared by reacting the salts of 2,4-dichloro-6-oxy-s-triazine

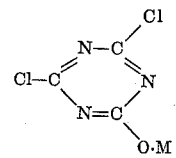

wherein M represents an alkali metal, with water-soluble polymers with primary amino or secondary amino groups which are situated either on side chains or in polymeric backbones. The reaction is shown to be:

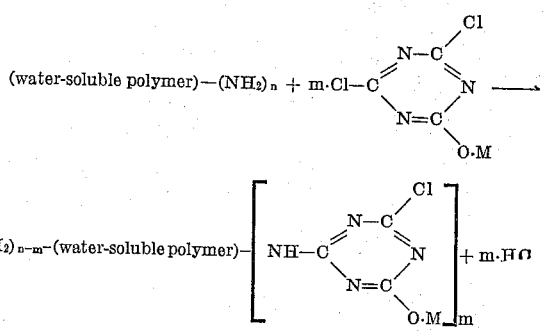

or

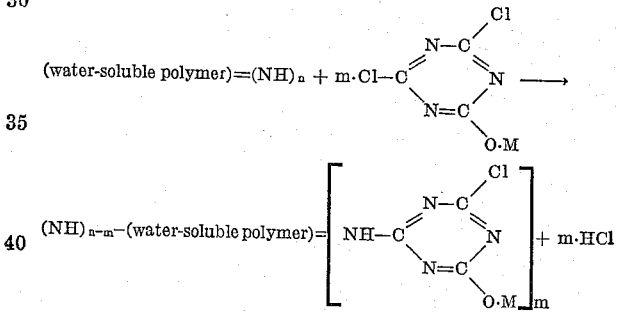

wherein $n$ and $m$ represent large integers, $n$ being equal to or larger than $m$. In the reaction products, it was shown that a large number of functional 3-chloro-5-oxytriazinyl groups are linked covalently to the polymeric chains. Practically, amino polymer is added little by little to a neutral to weakly alkaline solution of a salt of dichlorooxytriazine at a temperature of 20 to 60° C. The more amino groups in the polymer are substituted by 3-chloro-5-oxy-s-triazinyl groups, the more effective in hardening and the more stable in storage the product becomes.

The water-soluble polymers, preferably used for preparation of the polymeric hardeners of this invention, have a molecular weight more than 5,000 and a content of primary amino or secondary amino groups above $5 \times 10^{-5}$ mole per gram of polymer. Besides amino groups, the polymers contain preferably hydrophilic groups such as sulfonyl, carboxyl, primary amido, or hydroxyl groups, in order to make the polymer water-soluble. The suitable amino-containing polymer can be selected from natural polymeric materials such as proteins, as well as from synthetic water-soluble polymers. The examples are as follows:

(1) gelatin,
(2) casein,
(3) polyethyleneimine,
(4) polyvinylamine,
(5) copolymer of vinylamine, and
(6) Hofmann-degraded polyacrylamide.

The salts of 2,4-dichloro-6-hydroxy-s-triazine are prepared by partial hydrolysis of cyanuric chloride in dilute aqueous alkali solution at room temperature.

The cationic group represented by M in the foregoing formula can be selected from a wide range of cationic groups, because it plays a role only as a counter ion to a 3-chloro-5-oxy-s-triazinyl anionic group which takes a part in crosslinking gelatin molecules.

One advantage of our novel polymeric hardeners is a fast rate of hardening of gelatin in photographic products. The fast hardening is important in order to manufacture photographic products of constant quality without "after-hardening." Another advantage of our hardeners is that they have no influence on the photographic properties. A further advantage of our novel hardeners is that hardening process is not affected adversely by the presence of other kinds of photographic additives. Consequently our novel hardeners are especially suited for hardening color photographic materials with color-forming couplers incorporated therein. A further advantage of our novel hardeners in the very low level of toxicity to human bodies.

Since our novel hardeners are polymeric, they do not diffuse through gelatin but remain where added. By our novel hardeners, the individuals of a number of gelatin layers juxtaposed on one support can be hardened to the extent that are desirable for themselves and independent of the others. For instance, a particular layer can be hardened strongly, while other layers adjacent to it remain unhardened. This feature of our hardeners is important especially in manufacturing multilayer photographic materials, such as color photographic films and papers. Since usual hardeners known heretofore, with low molecular weight, diffuse through gelatin freely, the regulation of hardening among a number of gelatin layers is difficult. The polymeric hardeners, which have been disclosed heretofore, for example, dialdehyde starch and polyacrolein, are used in photographic materials unsatisfactorily, because of their detrimental effects on photographic properties, or because of discoloration in storage. Our novel hardeners are free from such defects.

To obtain effective hardening, a pH of an aqueous gelatin composition is preferably kept within a range of 5 to 12, beyond which 3-chloro-5-oxy-s-triazinyl groups are hydrolyzed gradually to give a product of lower hardening power.

While the exact amount of our novel hardeners may be varied depending on the particular type of gelatin dispersion and on the content of functional groups in hardeners, the amount of ranging 1.0 to 50 grams of hardener per kilogram of dry gelatin are most suitable. In these amounts, effective hardening is obtained to the extent that the treated gelatin layers are not damaged by the photographic process even at elevated temperatures.

In some cases, our novel hardeners can be used in combination with other classes of hardeners known heretofore to give a better hardening effect.

While the following examples describe in detail the methods for accomplishing the objects stated above, it is to be understood that they are given merely for the purpose of illustration and are not to be construed as limiting the scope of our invention.

*Example 1*

With mechanical stirring a solution of 150 grams of gelatin in 1350 milliliters of water was added little by little to a solution consisting of 56 grams of borax, 8.2 grams of sodium hydroxide, 75 grams of sodium salt of 2,4-dichloro-6-oxy-s-triazine and 1700 milliliters of water over 30 minutes at 45° C. The mixture was stirred at 45° C. for 90 minutes to produce a slightly turbid solution, added with 6 liters of acetone to coagulate the polymeric product, and decanted. The coagulated product was dissolved in 2 liters of water at 40° C., and coagulated again with the addition of 50 milliliters of 10% aqueous solution of potassium nitrate and 3 liters of acetone. The redispersion and coagulation were repeated again to remove the last trace of free dichlorotriazine compound. Finally the product was dissolved in water and diluted up to 2.5 liters. The pH was adjusted to 7.5 by the addition to acetic acid. Analysis indicated that in the final solution were involved the protein of 5.0 grams per 100 milliliters and the bonded reactive chlorine of $1.4 \times 10^{-3}$ mole per 100 milliliters. The solution of 3-chloro-5-oxy-s-triazinylated gelatin was set by cooling, stored for 10 days at 5° C., and heated to 40° C. to make a homogeneous solution again.

To 100 grams of silver iodobromide photographic emulsion containing 8.0 grams of gelatin, the 5% solution of 3-chloro-5-oxy-s-triazinylated gelatin was added. The emulsion was coated onto glass plates, and dried.

The coated gelatin is immersed in an aqueous solution, the temperature of which is raised at a rate of 1° C. per minute. The temperature, at which gelatin layer begins to melt, is called "melting point (M.P) of gelatin layer" in photographic arts.

The melting points of treated gelatin layer were as follows:

[M.P. in 2% $Na_2CO_3 \cdot H_2O$ solution (° C.)]

| Ml. of 5% solution of the hardener/100 g. of emulsion | After coating, days | | Incubated for 2 days at 50° C., 70% R.H. |
|---|---|---|---|
| | 3 | 30 | |
| 0 | 32 | 32 | 32 |
| 2 | 41 | 69 | 69 |
| 4 | 51 | 77 | >90 |
| 8 | 71 | 80 | >90 |

The foregoing plates were tested sensitometrically on the 30th day after coating in the following developer for 25 minutes at 20° C.:

| | | |
|---|---|---|
| Water | ml | 500 |
| Metol | g | 1.0 |
| Sodium sulfite, anhydrous | g | 80.0 |
| Hydroquinone | g | 8.0 |
| Sodium carbonate monohydrate | g | 28.0 |
| Potassium bromide | g | 4.0 |
| Water, to make | ml | 1,000 |

The following results were obtained:

| Ml. of 5% solution of the hardener/100 g. of emulsion | Fog | Gamma | Rel. speed |
|---|---|---|---|
| 0 | 0.08 | 1.7 | 100 |
| 2 | 0.07 | 1.5 | 98 |
| 4 | 0.07 | 1.5 | 95 |
| 8 | 0.06 | 1.3 | 90 |

*Example 2*

Three doubly coated films were prepared as follows:

*Film A.*—A subbed cellulose triacetate film was coated at a dry thickness of 10 microns with 100 milliliters of the first aqueous composition containing a black colloidal dispersion of silver and 6 grams of gelatin, chilled at 5° C. to set gelatin. Without drying the first layer, the wet film was coated at a dry thickness of 10 microns with 100 milliliters of the second aqueous composition containing a colloidal dispersion of silver bromide and 6 grams of gelatin, chilled and dried.

*Film B.*—The coating of the Film A was repeated except that the first aqueous composition was added with 6 milliliters of 5% aqueous solution of 3-chloro-5-oxy-s-triazinylated gelatin prepared in Example 1.

*Film C.*—The coating of Film A was repeated except the first aqueous composition was added with 4 milliliters of 2% aqueous solution of 2,4-dichloro-6-oxy-s-triazine.

The melting points of gelatin layers were determined in 2% aqueous solution of sodium carbonate monohydrate. The results were as follows:

[M.P. (° C.)]

| Film | Layer | 30 days after coating | Incubated at 50° C., 70% R.H. for 2 days |
|---|---|---|---|
| A | 1st | 32 | 35 |
|   | 2nd | 32 | 35 |
| B | 1st | 79 | >90 |
|   | 2nd | 32 | 40 |
| C | 1st | 75 | >90 |
|   | 2nd | 68 | 87 |

In the Film B partially hardened with our novel polymeric hardener, only the first layer was hardened to which the hardener had been added, while the second was practically unhardened. But in the case of Film C the second layer was also hardened to which no hardener had been added.

*Example 3*

Three films were prepared, each having 3 gelatin layers superimposed on a single support.

*Film D.*—A subbed cellulose triacetate film was coated with a 10 micron thick coating of the first aqueous composition containing a colloidal dispersion of silver iodobromide and 6 grams of gelatin in 100 milliliters. The dried film was coated at a dry thickness of 10 microns with 100 milliliters of the second aqueous composition containing a black colloidal dispersion of silver and 6 grams of gelatin. After drying, the doubly coated film was coated further with 100 milliliters of the third aqueous composition containing a yellow colloidal dispersion of silver and 6 grams of gelatin, and dried.

*Film E.*—The coating of Film D was repeated except that to each aqueous composition were added 4 milliliters of 5% aqueous solution of 3-chloro-5-oxy-s-triazinylated gelatin prepared in Example 1.

*Film F.*—The coating of Film D was repeated except that to each aqueous composition were added 1.5 milliliters of 2% aqueous solution of sodium salt of 2,4-dichloro-6-oxy-s-triazine.

The melting points of gelatin layers were determined. From the following results, it is seen that by our novel polymeric hardener (Film E) the homogeneous hardening of the whole coated composition could be easily attained, while by the corresponding hardener of low molecular weight (Film F) the bottom layer was hardened to a larger extent than the top layer.

[M.P. in 2% $Na_2CO_3.H_2O$ (° C.)]

| Film | Layer | After coating | | Incubated for 2 days, at 50° C., 70% R.H. |
|---|---|---|---|---|
|   |   | 3 days | 30 days |   |
| D | 1st | 32 | 32 | 35 |
|   | 2nd | 32 | 32 | 35 |
|   | 3rd | 32 | 32 | 35 |
| E | 1st | 56 | 81 | >90 |
|   | 2nd | 56 | 81 | >90 |
|   | 3rd | 53 | 78 | >90 |
| F | 1st | 73 | 85 | >90 |
|   | 2nd | 61 | 76 | 89 |
|   | 3rd | 49 | 69 | 71 |

*Example 4*

Some primary amido groups in polyacrylamide were converted into primary amino groups by Hofmann degradation, as described in Industrial and Engineering Chemistry, vol. 48, pp. 2132–2137 (1956). At 5° C., 150 milliliters of 10% polyacrylamide were added to a solution consisting of 300 milliliters of 10% aqueous solution of sodium hypochlorite, 20 grams of sodium hydroxide and 300 milliliters of water. With mechanical stirring, the temperature was raised to 25° C. and kept at 25° C. for 60 minutes. After neutralized by the addition of 35 milliliters of concentrated hydrochloric acid, the reaction mixture was dialyzed in cellulose tubes against running water over 24 hours to remove the salts. The Van Slyke analysis indicated that the Hofmann-degraded polyacrylamide contained $4.2 \times 10^{-3}$ mole of primary amino groups per gram of dry polymer.

At 45° C. with stirring, to a solution consisting of 20 grams of sodium salt 2,4-dichloro-6-oxy-s-triazine, 15 grams of borax, 23 milliliters of 10% aqueous solution of sodium hydroxide, and 380 milliliters of water, were added 300 milliliters of aqueous solution containing 5.2 grams of the Hofmann-degraded polyacrylamide. The mixture was stirred at 45° C. for 90 minutes, neutralized with acetic acid to a pH value of 8.3, added with 2 liters of acetone to coagulate the polymeric products, and decanted. The polymeric product was dissolved in 500 milliliters of water and precipitated again by the addition of 10 milliliters of a 10% aqueous solution of potassium nitrate and 1.5 liters of acetone. The dissolution and precipitation were repeated to remove the unbonded dichlorotriazine compound. Finally the coagulated polymer was dissolved in fresh warm water sufficient to make a solution of 200 milliliters.

Subbed cellulose triacetate films were coated at a dry thickness of 20 microns with 100 grams of photographic emulsions containing silver chlorobromide, 8 grams of gelatin, 2 grams of polyacrylamide, and varying amounts of the solution of polymeric hardener, and dried. The melting points of the films were measured in water. The results were as follows:

[M.P. in water (° C.)]

| Ml. of hardener solution/100 g. of emulsion | After coating | | Incubated for 2 days, at 50° C., 70% R.H. |
|---|---|---|---|
|   | 3 days | 30 days |   |
| 0 | 32 | 32 | 35 |
| 5 | 45 | 70 | >90 |
| 10 | 72 | 90 | >90 |

*Example 5*

At 45° C. with mechanical stirring, to a solution of pH 10 consisting of 606 milliliters of 10% aqueous solution of sodium salts of 2,4-dichloro-6-oxy-s-triazine and 22 milliliters of 10% aqueous solution of sodium hydroxide, were added little by little over 10 minutes two solutions simultaneously: 100 milliliters of aqueous solution containing 5 grams of polyethyleneimine and 20 milliliters of sodium hydroxide. For 2 hours the mixture was stirred at 45° C. and kept at pH 10 by the addition of 10% aqueous solution of sodium hydroxide, amounting to 38 milliliters. The mixture was dialyzed in cellulose tubes against water for 24 hours to remove the materials of low molecular weight, and diluted with water up to 1,000 milliliters.

A cellulose triacetate film was coated with a 7% aqueous solution of gelatin, and dried. Onto it was coated the mixture of 1 kilogram of silver iodobromide emulsion containing 60 grams of gelatin and 100 milliliters of the foregoing solution of 3-chloro-5-oxy-s-triazinylated polyethyleneimine, to form a dry coating of a thickness of 15 microns.

On the 30th day after coating, the melting points (in water) of the emulsion and the gelatin layer were 82° C. and 34° C. respectively.

The film was printed with a line image and developed as in Example 1. When the developed film was soaked in warm water at 40° C., the bottom gelatin layer swelled and softened. But the top image-bearing layer kept its mechanical strength and could be peeled off and transferred to another support.

We claim:
1. A method of producing a hardened gelatin layer in a photographic sensitive material, which comprises uniformly mixing an aqueous gelatin dispersion of pH be- tween 5 and 12, prior to coating the dispersion upon a support and drying, with 0.1 to 5 percent, based on the weight of the gelatin, of a reaction product of a polymeric material having a molecular weight above 5000 and containing more than $5\times10^{-5}$ mole per gram of a member selected from the group consisting of primary and secondary amino groups with a compound having the following formula:

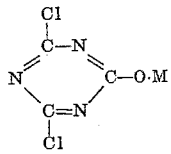

wherein M represents an alkali metal, the

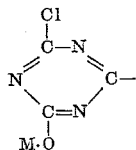

groups in said reaction product being linked covalently with the nitrogen atoms of said amino groups.

2. The method of producing a hardened gelatin layer as claimed in claim 1, wherein said alkali metal is selected from sodium and potassium.

3. The method of producing a hardened gelatin layer as claimed in claim 1, wherein said polymeric material is selected from the group consisting of gelatin, casein, polyethyleneimine, polyvinylamine and vinylamine copolymer.

4. The method of producing a hardened gelatin layer as claimed in claim 1, wherein said polymeric material is an amino polymer obtained by treating polyacrylamide with an aqueous alkaline hypochlorite solution.

5. The method of producing a hardened gelatin layer as claimed in claim 1, wherein said gelatin dispersion is a silver-halide photographic emulsion.

6. A gelatin layer having a support therewith, the gelatin of which having been hardened by incorporating into an aqueous gelatin dispersion of pH between 5 and 12, prior to coating and drying, from 0.1 to 5 percent, based on the weight of the gelatin, of a reaction product of a polymeric material having a molecular weight above 5000 and containing more than $5\times10^{-5}$ mole per gram of a member selected from the group consisting of primary and secondary amino groups with a compound having the following formula:

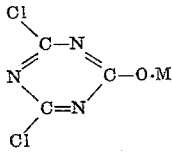

wherein M represents an alkali metal, the

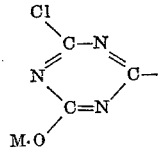

groups in said reaction product being linked covalently with the nitrogen atoms of said amino groups.

7. The gelatin layer as claimed in claim 6, wherein said alkali metal is selected from sodium and potassium.

8. The gelatin layer as claimed in claim 6, wherein said polymeric material is selected from the group consisting of gelatin, casein, polyethyleneimine, polyvinylamine and vinylamine copolymer.

9. The gelatin layer as claimed in claim 6, wherein said polymeric material is an amino polymer obtained by treating polyacrylamide with an aqueous alkaline hypochlorite solution.

10. The gelatin layer as claimed in claim 6, wherein said gelatin dispersion is a silver-halide photographic emulsion.

11. A photographic sensitive material comprising a support and a plurality of gelatin layers, at least one gelatin layer having been hardened by incorporating into an aqueous gelatin dispersion of pH between 5 and 12, prior to casting and drying, from 0.1 to 5 percent, based on the weight of the gelatin, of a reaction product of a polymeric material having a molecular weight above 5000 and containing more than $5\times10^{-5}$ mole per gram of a member selected from the group consisting of primary and secondary amino groups with a compound having the following formula:

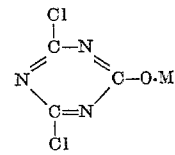

wherein M represents an alkali metal, the

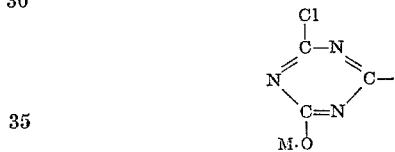

groups in said reaction product being linked covalently with the nitrogen atoms of said amino groups.

12. The photographic sensitive material as claimed in claim 11, wherein said alkali metal is selected from sodium and potassium.

13. The photographic sensitive material as claimed in claim 11, wherein said polymeric material is selected from the group consisting of gelatin, casein, polyethyleneimine, polyvinylamine and vinylamine copolymer.

14. The photographic sensitive material as claimed in claim 11, wherein said polymeric material is an amino polymer obtained by treating polyacrylamide with an aqueous alkaline hypochlorite solution.

15. The photographic sensitive material as claimed in claim 6, wherein said gelatin dispersion is a silver-halide photographic emulsion.

References Cited

UNITED STATES PATENTS 3,138,461   6/1964   Ryan _____ 96—111 X

FOREIGN PATENTS 1,319,540   3/1962   France.

OTHER REFERENCES

Journal of the Society of Organic Synthetic Chemistry, Japan, vol. 18 pp. 175–183 (1960).

NORMAN G. TORCHIN, *Primary Examiner.*

J. RAUBITSCHEK, *Assistant Examiner.*